US012691936B2

(12) United States Patent
Wu et al.

(10) Patent No.: US 12,691,936 B2
(45) Date of Patent: Jul. 28, 2026

(54) RECONFIGURABLE STEERING FEEL DESIGN METHOD AND CONTROL SYSTEM FOR STEER-BY-WIRE

(71) Applicant: Shanghai Jiao Tong University, Shanghai (CN)

(72) Inventors: Xiaodong Wu, Shanghai (CN); Shuhan Liu, Shanghai (CN); Hangyu Lu, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 0 days.

(21) Appl. No.: 19/192,641

(22) Filed: Apr. 29, 2025

(65) Prior Publication Data

US 2025/0333104 A1      Oct. 30, 2025

Related U.S. Application Data

(63) Continuation-in-part of application No. PCT/CN2024/107210, filed on Jul. 24, 2024.

(30) Foreign Application Priority Data

Apr. 30, 2024      (CN) ........................ 202410537920.0

(51) Int. Cl.
*B62D 6/00*          (2006.01)
(52) U.S. Cl.
CPC .................................... *B62D 6/008* (2013.01)
(58) Field of Classification Search
None
See application file for complete search history.

(56) References Cited

U.S. PATENT DOCUMENTS

2022/0266901 A1      8/2022   Kim et al.

FOREIGN PATENT DOCUMENTS

CN          113306624 A      8/2021
CN          113799872 A      12/2021
(Continued)

OTHER PUBLICATIONS

Shuai, Su-yang, Control method and system based on steer-by-wire road feel simulation, 2021 (Year: 2021).*

(Continued)

*Primary Examiner* — Abby J Flynn
*Assistant Examiner* — Bakari Underwood
(74) *Attorney, Agent, or Firm* — BLANK ROME LLP

(57)          ABSTRACT

The present invention relates to a reconfigurable steering feel design method and control system for steer-by-wire. The method includes: constructing a steering feel feedback model, the steering feel feedback model including an alignment torque module based on rack force observation, an assist torque module, a friction compensation torque module, a damping compensation torque module, an inertia compensation torque module, and a soft stop limiting torque module, and adding outputs of all modules to obtain a total expected steering feel motor torque; inputting signals of a steering wheel angle, speed and torque, an observed rack force and a vehicle speed into the designed steering feel feedback model to obtain the total expected steering feel motor torque, transmitting it to a steering feel motor, and outputting this steering feel feedback torque to a steering wheel through the steering feel motor; each module in the designed steering feel feedback model being provided with adjustable parameters. Compared with the existing technologies, the present invention incorporates the characteristics of reconfigurability, and can adapt to different steering wheel (Continued)

hardware characteristics and steering feel requirements by adjusting relevant parameters.

8 Claims, 3 Drawing Sheets

(56)                    References Cited

FOREIGN PATENT DOCUMENTS

| CN | 114954640 | A |   | 8/2022 | | |
|----|-----------|---|---|--------|---|---|
| CN | 115503812 | A | * | 12/2022 | ........... | B62D 5/0466 |
| CN | 113799872 | B | * | 1/2023 | ........... | B62D 5/0472 |
| CN | 116853348 | A |   | 10/2023 | | |
| CN | 117068259 | A |   | 11/2023 | | |
| CN | 118323259 | A |   | 7/2024 | | |

OTHER PUBLICATIONS

Hou, Shi-yang, A road sense simulation method, device, electronic equipment and storage medium, 2022 (Year: 2022).*
International Search Report for PCT/CN2024/107210 mailed Jan. 23, 2025, 4 pages.

* cited by examiner

RECONFIGURABLE STEERING FEEL DESIGN METHOD AND CONTROL SYSTEM FOR STEER-BY-WIRE

RELATED APPLICATIONS

This application is a continuation-in-part (CIP) application claiming benefit of PCT/CN2024/107210 filed on Jul. 24, 2024, which claims priority to Chinese Patent Application No. 202410537920.0 filed on Apr. 30, 2024, the disclosures of which are incorporated herein in their entirety by reference.

TECHNICAL FIELD

The present invention relates to the field of automotive control technology, in particular to a reconfigurable steering feel design method and control system for steer-by-wire.

BACKGROUND

With the rapid development of automotive technology, steer-by-wire technology has gradually emerged as an advanced technology in the field of driving and handling, and is receiving increasing attention from car companies and numerous consumers. Compared with traditional mechanical steering systems, the steer-by-wire system eliminates the mechanical connection between the steering wheel and the steered wheels, introduces an electronic control unit and a steering feel motor, thus eliminating the need for mechanical connection apparatuses and implementing instruction transmission through electrical signals to handle the steering of the car. Its flexible control mode and fast and accurate response characteristics highly meet the development needs of modern automotive electrification and intelligentization.

Referring to FIG. 1, the steer-by-wire system consists of three main parts, including a steering wheel module, a steering actuator module, and a main controller module. The steering wheel module includes a steering wheel, steering wheel angle and torque sensors, and a steering wheel steering feel motor. The main functions of the steering wheel module are to convert the driver's steering intention (steering wheel angle) into a digital signal and transmit it to a steer-by-wire controller; simultaneously receive a torque signal from the main controller, and generate a steering wheel alignment torque to provide corresponding steering feel information to the driver. The steering actuator module includes a front wheel steering angle sensor, a steering actuation motor, a steering motor controller, a front wheel steering assembly, etc. The functions of the steering actuator module are to receive a command from the main controller and control the rotation of the steered wheels through the steering motor controller to achieve the driver's steering intention. The main controller analyzes and processes the acquired signals, identifies the vehicle's motion state, sends an instruction to the steering feel motor and the steering motor, controls the operation of the two motors, and ensures ideal vehicle response under various working conditions.

In the steer-by-wire system, there is no traditional steering transmission shaft between the steering wheel and the steered wheels, the driver's steering intention is obtained by the angle and torque sensors in the steering wheel module, and the vehicle's steering operation is achieved by controlling the steering motor to drive the wheels; the road information is obtained through the position and force sensors in the steering actuator module, and the force feedback to the driver is achieved by controlling the steering feel motor; at the same time, the steering controller converts the vehicle's dynamic state information into the alignment torque information of the steering wheel, which is transmitted to the steering feel motor in the steering wheel module to provide the driver with the corresponding steering feel.

Steering feel design and control technology is an indispensable part of the steer-by-wire technology, is an important medium for drivers to feel the road condition and the vehicle's motion state, and is responsible for providing feedback on the vehicle's driving conditions. With the continuous advancement of technology, traditional mechanical steering systems have gradually revealed their limitations in meeting consumers' increasing demands for improved handling experience. In this era, electronicization and intelligentization have become the two key trends in the automotive industry. Under the trend of electronicization and intelligentization, vehicle systems have not only become more advanced, but the popularization of intelligent driver assistance systems has also put forward higher requirements for the handling performance of vehicles. Drivers not only expect the vehicle to respond better to control instructions, but also hope to receive more realistic steering feel feedback. In this context, the steering feel design and control technology for steer-by-wire has become a key innovative direction, aiming to provide drivers with a more intelligent, sensitive, and personalized steering experience.

The development of steering feel design and control technology has a significant influence on improving the driver experience. Firstly, through electronic steering feel, drivers can more accurately perceive the vehicle's motion state on the road, thus better mastering the vehicle's handling. Secondly, this technology steer-by-wire provides drivers with a more personalized handling experience. Drivers can adjust the intensity, sensitivity, and other parameters of steering feel through system settings according to their preferences and habits, making the driving experience more tailored to individual needs. This personalized experience not only enhances the pleasure of driving, but also increases the driver's sense of control over the vehicle. The rise of the steering feel design and control technology is also closely related to the goal of sustainable development. This technology can reduce the weight and complexity of traditional mechanical steering systems, which helps to achieve lightweight design of automobiles. Under the current emphasis on sustainable development and environmental protection in the automotive industry, lightweight design has become one of the directions pursued by manufacturers. Therefore, the development of the steering feel design and control technology not only conforms to the trend of the rise of electric vehicles, but also aligns with the common pursuit of sustainable development in the entire automotive industry.

In summary, the rise of the steering feel design and control technology for steer-by-wire is an innovative challenge to traditional mechanical steering systems, and also a positive response from the automotive industry in the direction of electronicization, intelligentization, and sustainable development. The development of this technology not only improves the driving experience of the driver, but also promotes the upgrading and innovation of the entire automotive industry chain. In the future, with the continuous development of intelligent driving and electric vehicles, this technology is expected to become one of the key technologies for improving the driving experience, so as to create a more intelligent, safe, and comfortable driving environment for drivers.

The invention with the publication number CN117068259A discloses a steering feel simulation system and a control method. The steering feel simulation system includes a steering wheel, a steering column, a steering feel motor, a steering feel motor controller, and a chassis domain controller which are connected; when the steering wheel is rotated, the steering feel motor transmits a steering wheel signal to the steering feel motor controller; the steering feel motor controller processes the steering wheel signal and transmits it to the chassis domain controller; the chassis domain controller calculates a steering feel feedback torque and transmits it to the steering feel motor controller; the steering feel motor is controlled to generate the steering feel feedback torque, allowing the driver to perceive road conditions and vehicle state. A control method based on the steering feel simulation system is provided, including the following steps: the steering feel motor controller processes the steering wheel signal and transmits it to the chassis domain controller; the chassis domain controller calculates the steering feel feedback torque and feeds it back to the steering feel motor controller, causing the steering feel motor to generate the steering feel feedback torque that the driver can perceive. This steering feel simulation system can obtain the feedback torque that reflects the road conditions and vehicle's dynamic state, and allow the driver to perceive.

The invention with the publication number CN113799872A discloses a control method and system based on steering feel simulation for steer-by-wire, belonging to the field of automotive steering technology, in which a steering feel motor controller receives a steering angle signal from a steering wheel angle sensor and a torque signal from a steering wheel torque sensor through a CAN bus, determines a driving direction and a driving angle, and makes corresponding controls; a steering feel motor controller obtains a damping compensation torque, an alignment compensation torque, a friction compensation torque, and a soft stop compensation torque through the steering wheel angle and vehicle speed based on the output torque of an EPS motor, achieves real-time steering feel simulation of the vehicle in the driving process through the compensation torques in the steering feel motor controller and the road simulation compensation torque determined based on road excitation, vehicle posture, and road conditions, and outputs a total torque request to a steering feel motor; the steering feel motor outputs corresponding speed. This steering feel simulation system simulates steering feel through multiple modules, achieving the same driving feel as power assist steering in traditional automobiles.

The invention with the publication number CN113306624A discloses a steering feel adjustment method for a steer-by-wire system based on a steering feel torque feedback model, including the following steps: 1) constructing the steering feel feedback model for the steer-by-wire system; 2) performing objective evaluation on steering feel feedback based on the steering feel feedback model; and 3) setting adjustment standards based on evaluation results to perform steering feel adjustment. Compared with the existing technologies, this invention has the advantages of comprehensive consideration, flexible steering feel adjustment, and easiness in operation.

The invention with the publication number CN114954640A discloses a steering feel simulation apparatus for a steer-by-wire system, and a control method thereof. The apparatus includes a steering column, torque and angle sensors, a reducer, a motor, and a controller which are sequentially connected. The method includes: calculating two components of rack force based on a rack and pinion model and a vehicle model; performing weighted calculation on the two components to obtain estimated rack force; combining the estimated rack force with the vehicle's dynamic state to calculate a basic steering feel feedback; adding a compensation value to the basic steering feel feedback to obtain a torque reference value of the steering column; performing, by the controller, summation calculation on the torque reference value, the rack end protection torque and the disturbance estimation torque to obtain the target torque of the steering feel motor; controlling, by the controller, the steering feel motor to output the target torque to achieve the real-time steering feel simulation of the vehicle in the driving process. When using the steer-by-wire system, this steering feel simulation system can help the driver maintain the steering feel to the vehicle, thus ensuring the handling and safety of the vehicle under extreme situations.

The existing steering feel design and control technologies have shortcomings in multiple aspects, as follows:

Firstly, in low-speed driving scenarios, the existing technologies are difficult to provide appropriate steering feel feedback; some technologies lack lightweight, causing drivers to be fatigued; some technologies are too lightweight and may easily cause safety accidents. Inappropriate steering feel feedback will reduce driving comfort and handling.

When driving at high speeds, the existing technologies cannot achieve the characteristics of distinct on-center steering feel and relatively mild steering feel in the large steering angle zone, resulting in insufficient differentiation of steering feel performance at high speeds, making it difficult for the driver to accurately perceive the dynamic state of the vehicle. In addition, there is also a problem of unclear steering feel at high speeds, making it difficult for drivers to perceive changes in road conditions.

In terms of steering feel flexibility, the existing technologies lack sufficient adjustability and cannot achieve the reconfigurability of steering feel through parameter adjustment, which limits the ability of drivers to personalize steering feel based on individual preferences or different driving conditions.

SUMMARY

The purpose of the present invention is to overcome the shortcomings of the existing technologies by providing a reconfigurable steering feel design method and control system for steer-by-wire that can achieve a lightweight steering feel at low speeds and a clear steering feel at high speeds.

The purpose of the present invention is achieved by adopting the following technical solution:

A reconfigurable steering feel design method for steer-by-wire, including the following steps:

constructing a steering feel feedback model, the steering feel feedback model including an alignment torque module based on rack force observation, an assist torque module, a friction compensation torque module, a damping compensation torque module, an inertia compensation torque module, and a soft stop limiting torque module respectively configured to calculate an alignment torque based on rack force observation, an assist torque, a friction compensation torque, a damping compensation torque, an inertia compensation torque, and a soft stop limiting torque, and adding them to obtain a total expected steering feel motor torque;

inputting signals of a steering wheel angle, speed and torque, an observed rack force and a vehicle speed into the steering feel feedback model to obtain the total expected steering feel motor torque, transmitting it to a steering feel motor, and outputting this steering feel feedback torque to a steering wheel through the steering feel motor; and adjusting adjustable parameters of each module in the steering feel feedback model to adapt to different steering wheel hardware characteristics and steering feel requirements.

Further, the alignment torque module based on rack force observation is configured to segmentally design alignment torques at low speeds and medium-to-high speeds, and curve design alignment torques at medium-to-high speeds by adopting a hyperbolic tangent function;

the assist torque module is configured to curve design an assist torque based on an exponential function;

the friction compensation torque module is configured to design a dynamic friction compensation torque and a static friction compensation torque respectively;

the damping compensation torque module is configured to design a damping compensation torque related to steering wheel speed and a damping compensation torque in an aligning process respectively, and adopt an arctangent function and an exponential function to segmentally form the damping compensation torque related to the steering wheel speed;

the inertia compensation torque module is configured to design an inertia compensation torque by adopting a steering wheel torque differentiation method;

the soft stop limiting torque module is configured to design a soft stop limiting torque by adopting an exponential function.

Further, a calculation expression for the alignment torque module based on rack force observation is:

when the vehicle speed v is less than $v_0$, $$T_{alignment} = K_{a\_low}(v) \cdot G \cdot F_{rack} \cdot R$$

where $T_{alignment}$ is the alignment torque based on rack force observation, $K_{a\_low}(v)$ is a gain adjustment coefficient of the alignment torque with the vehicle speed, G is a gain coefficient of the alignment torque, $F_{rack}$ is the rack force obtained by a rack force observer, R is an equivalent radius of a small gear that converts the rack force into the alignment torque, and $v_0$ is a low-speed threshold, where parameters $K_{a\_low}(v)$ and G are adjustable parameters to achieve a purpose of reconfigurability of steering feel at low speeds;

when the vehicle speed v is greater than $v_0$, $$T_{alignment} = K_{state} \cdot K_{a\_high}(v) \cdot G \cdot \tanh(K_i(v) \cdot F_{rack} \cdot R)$$

where $K_{a\_high}$ (v) is a gain adjustment coefficient of the alignment torque with the vehicle speed, $K_i(v)$ is an adjustment coefficient of a gradient between the alignment torque and the steering wheel angle with the vehicle speed, K state is an adjustment coefficient of the alignment torque in the steering wheel aligning process, G is a gain coefficient of the alignment torque, $F_{rack}$ is the rack force obtained by the rack force observer, and R is an equivalent radius of a small gear that converts the rack force into the alignment torque, where parameters $K_{a\_low}(v)$, $K_i(v)$, $K_{state}$, G are adjustable parameters to achieve a purpose of reconfigurability of steering feel at medium-to-high speeds;

the adjustment laws of the adjustable parameters of the alignment torque module based on rack force observation include:

increasing parameter $K_{a\_low}(v)$ will increase the alignment torque at the corresponding vehicle speed, making the steering feel at low speeds become relatively heavy;

increasing parameter $K_{a\_high}$ (v) will increase the alignment torque at the corresponding vehicle speed, making the steering feel at low speeds become relatively heavy;

increasing parameter $K_i(v)$ will cause a critical angle of the steering wheel angle to become smaller when the steering wheel torque at medium-to-high speeds reaches saturation;

decreasing parameter K will decrease the alignment torque in the aligning process.

Further, a calculation expression for the assist torque module is:

$$T_{assist} = G_a \cdot \left(e^{K_a|T_h|} - 1\right) \cdot \text{sgn}(T_h)$$

where $T_{assist}$ is the assist torque, $T_h$ is the steering wheel torque obtained by a steering wheel torque sensor, $G_a$ is an assist gain coefficient, and $K_a$ is an assist curve rise coefficient, where parameters $G_a$ and $K_a$ are adjustable parameters;

the adjustment laws of the adjustable parameters of the assist torque module include:

increasing parameter $G_a$ will increase the assist torque;

increasing parameter $K_a$ will increase a gradient of the assist torque with respect to the steering wheel torque, thus increasing the assist torque.

Further, a calculation expression for the friction compensation torque module is:

$$T_{friction} = T_{dynamic} + T_{static1} + T_{static2}$$

$$T_{dynamic} = \begin{cases} f_{right} \cdot \tanh(a_f \cdot \dot{\theta}_{sw}) & \dot{\theta}_{sw} > 0 \\ f_{left} \cdot \tanh(a_f \cdot \dot{\theta}_{sw}) & \dot{\theta}_{sw} < 0 \end{cases}$$

where $T_{friction}$ is the friction compensation torque, $T_{dynamic}$ is the dynamic friction compensation torque, $\dot{\theta}_{sw}$ is the steering wheel speed, which is obtained by differentiating the steering wheel angle signal detected by a steering wheel angle sensor, $f_{right}$, $f_{left}$ are respectively the magnitudes of friction compensation torques when rotating the steering wheel to the right and rotating the steering wheel to the left, and $a_f$ is a curve rise coefficient, where $f_{right}$, $f_{left}$, $a_f$ are adjustable parameters;

$$T_{static1} = \begin{cases} f_{static} \cdot \tanh(b_f \cdot T_h) + c_f \cdot \text{sgn}(T_h) & |T_h| < f_{static}, \dot{\theta}_{sw} = 0 \\ f_{static} \cdot \text{sgn}(T_h) & |T_h| \geq f_{static}, \dot{\theta}_{sw} = 0 \end{cases}$$

$$T_{static2} = \frac{f_{static}}{e^{d_f|\theta_{sw}-\theta_{pre}|}} \cdot \text{sgn}(\theta_{sw} - \theta_{pre})$$

where $T_{static1}$ and $T_{static2}$ are both static friction compensation torques, $\theta_{sw}$ is the steering wheel angle, $T_h$ is the steering wheel torque, $f_{static}$ is the magnitude of compensated static friction, $\theta_{pre}$ is an angle value of the steering wheel at the beginning of rotating at a previous time, and $b_f$, $c_f$, $d_f$ are relevant adjustment coefficients for static friction compensation, where $f_{static}$, $b_f$, $c_f$, $d_f$ are adjustable parameters;

the adjustment laws of the adjustable parameters of the friction compensation torque module include:

increasing parameter $f_{right}$ will cause a frictional resistance to become smaller when rotating the steering wheel to the right;

increasing parameter $f_{left}$ will cause a frictional resistance to become smaller when rotating the steering wheel to the left;

increasing parameter $a_f$ will cause a corresponding rotating steering wheel speed to become smaller when the dynamic friction compensation torque reaches saturation;

increasing parameter $f_{static}$ will cause a static friction force felt by a driver to become smaller;

increasing parameter $b_f$ or $c_f$ will cause a static friction compensation to become larger before rotating the steering wheel;

increasing parameter $d_f$ will cause the static friction compensation to become smaller at the beginning of rotating the steering wheel.

Further, the functions of the damping compensation torque module include damping compensation at medium-to-high speeds and damping compensation in an aligning process, and a corresponding calculation expression is:

$$T_{damping} = T_{damping1} + T_{damping2}$$

$$T_{damping1} = B(v) \cdot \tanh(a_{d3} \cdot \dot{\theta}_{sw})$$

$$B(v) = \begin{cases} 0 & v \leq v_{d1} \\ a_{d1} \cdot \mathrm{atan}[a_{d2}(v - v_{d1})] & v_{d1} < v < v_{d2} \\ a_{d4} \cdot \exp[a_{d5}(v - v_{d1})] & v \geq v_{d2} \end{cases}$$

where $T_{damping}$ is the damping compensation torque, $T_{damping1}$ is the damping compensation torque at medium-to-high speeds, $T_{damping2}$ the damping compensation in the aligning process, the speeds are medium-to-high speeds when the vehicle speed v is greater than $v_0$, and $v_0$ is a low speed threshold; $\dot{\theta}_{sw}$ is the steering wheel speed, B(v) is an adjustment coefficient of the damping compensation torque with the vehicle speed, $v_{d1}$ is a critical vehicle speed at the beginning of applying the damping compensation, $v_{d2}$ is a boundary vehicle speed of medium-to-high speeds, after which the damping compensation increases rapidly with the increase of the vehicle speed, and $a_{d1}$, $a_{d2}$, $a_{d3}$, $a_{d4}$, ads are relevant adjustment parameters of the damping compensation torque, wherein $v_{d1}$, $v_{d2}$, $a_{d1}$, $a_{d2}$, $a_{d3}$, $a_{d4}$, $a_{d5}$ are all adjustable parameters;

$$T_{damping2} = -a_{d6}\left[e^{a_{d7}(|\dot{\theta}_{sw}|-\dot{\theta}_0)} - 1\right] \cdot \frac{|\dot{\theta}_{sw}| - \dot{\theta}_0}{180} \cdot \mathrm{sgn}(\dot{\theta}_{sw}), |\theta_{sw}| > \theta_0 |\dot{\theta}_{sw}| > \dot{\theta}_0$$

where $\theta_{sw}$ is the steering wheel angle, $\dot{\theta}_{sw}$ is the steering wheel speed, $\theta_0$ is a critical steering wheel angle at the beginning of applying the damping compensation in the aligning process, $\dot{\theta}_0$ is a critical steering wheel speed at the beginning of applying the damping compensation in the aligning process, and $a_{d6}$, $a_{d7}$ are relevant adjustment parameters for the damping compensation torque in the aligning process, where $\theta_0$, $\dot{\theta}_0$, $a_{d6}$, $a_{d7}$ are all adjustable parameters;

the adjustment laws of the adjustable parameters of the damping compensation torque module include:

increasing parameter $v_{d1}$ will increase the critical vehicle speed value at the beginning of applying the damping compensation;

increasing parameter $v_{d2}$ will increase the critical vehicle speed value when the damping compensation enters a rapidly increasing segment with the vehicle speed;

increasing parameter $a_{d1}$ or $a_{d4}$ will increase the damping compensation torque;

increasing parameter $a_{d2}$ will cause an increase gradient of the damping compensation with the vehicle speed to become larger within a medium speed range;

increasing parameter ads will cause an increase gradient of the damping compensation with the vehicle speed to become larger within a high speed range;

increasing parameter $a_{d3}$ will cause an increase gradient of the damping compensation with the steering wheel speed to become larger;

increasing parameters $\theta_0$, $\dot{\theta}_0$ will respectively increase the critical steering wheel angle and the critical steering wheel speed at the beginning of applying the damping compensation in the aligning process, so as to prevent the steering wheel aligning speed from being too fast in the aligning process, without influencing a driver to normally rotate the steering wheel;

increasing parameter $a_{d6}$ or $a_{d7}$ will cause a damping in the aligning process to become larger, so as to further limit the steering wheel speed.

Further, a calculation expression for the inertia compensation torque module is:

$$T_{inertia} = G_{inertia}\dot{T}_h$$

where $T_{inertia}$ is the inertia compensation torque, $\dot{T}_h$ is a differential of the steering wheel torque, $G_{inertia}$ is a gain coefficient of the inertia compensation torque, where $G_{inertia}$ is an adjustable parameter;

the adjustment law of the adjustable parameter of the inertia compensation torque module includes:

increasing parameter $G_{inertia}$ will increase the inertia compensation torque.

Further, a calculation expression for the soft stop limiting torque module is:

$$T_{limit} = \begin{cases} k_{limit}\left[e^{a_{limit}(|\theta_{sw}|-\theta_{limit})} - 1\right] \cdot \mathrm{sgn}(\theta_{sw}) & |\theta_{sw}| > \theta_{limit} \\ 0 & |\theta_{sw}| \leq \theta_{limit} \end{cases}$$

where $T_{limit}$ is the soft stop limiting torque, $\theta_{sw}$ is the steering wheel angle detected by a steering wheel angle sensor, $\theta_{limit}$ is a limiting angle, $k_{limit}$ is a limiting torque gain coefficient, and $a_{limit}$ is a limiting torque rise coefficient, where $\theta_{limit}$ $k_{limit}$ are adjustable parameters;

the adjustment laws of the adjustable parameters of the soft stop limiting torque module include:

increasing parameter $\theta_{limit}$ will increase a maximum rotatable angle of the steering wheel;

increasing parameter $k_{limit}$ will cause the limiting torque to increase proportionally more rapidly after the steering wheel angle exceeds the limiting angle;

increasing parameter a limit will cause the limiting torque to increase more rapidly after the steering wheel angle exceeds the limiting angle, and its effect is greater than parameter $k_{limit}$.

Further, the method further includes constructing multiple objective evaluation indicators of steering feel, and adjusting the adjustable parameters of each module in the steering feel feedback model based on each objective evaluation indicator of steering feel;

the objective evaluation indicators include:

a steering angle hysteresis indicator, which is defined as a residual steering wheel angle when the steering wheel torque is zero, and describes a hysteresis of the steering wheel angle with respect to the steering wheel torque;

a steering friction indicator, which is defined as a value of a residual steering wheel torque when the steering wheel angle is zero, and describes a friction level of a steering system;

a steering torque stiffness indicator, which is defined as a gradient of the steering wheel torque when the steering wheel angle is zero, and describes a feel of a driver to a center position of the steering wheel when driving at high speeds;

a steering alignment capability indicator, which is defined as a residual lateral acceleration of a vehicle when the steering wheel torque is zero, and directly reflects an aligning performance of the steering system of the vehicle;

a steering on-center force indicator, which is defined as a magnitude of the steering wheel torque when a lateral acceleration of the vehicle is zero, and describes a dry friction of the steering system;

a steering on-center feel indicator, which is defined as a gradient of the steering wheel torque when the lateral acceleration of the vehicle is zero, and directly reflects handling characteristics of the vehicle;

a steering nonlinear force indicator, which is defined as a magnitude of the steering wheel torque when the lateral acceleration of the vehicle is 0.1 g, and describes a magnitude of the nonlinear force of the steering wheel;

a steering linearity indicator, which is defined as a ratio of the gradient of the steering wheel torque to the steering on-center feel when the lateral acceleration of the vehicle is 0.1 g, and describes a change extent of the steering feel when the steering wheel deviates from a center area;

a maximum steering wheel torque indicator, which is defined as a maximum value of the steering wheel torque at medium-to-low speeds, and describes the steering feel of the driver during large-angle steering at medium-to-low speeds;

an average steering wheel torque indicator, which is defined as an average value of the steering wheel torque during sine steering at medium-to-low speeds, and describes a level of the steering wheel torque at medium-to-low speeds.

The present invention further provides a reconfigurable steering feel control system for steer-by-wire, including a memory and a processor, the memory storing a computer program which, when invoked by the processor, implements the steps of the method described above.

Compared with the existing technologies, the present invention has the following advantages:

(1) In the present invention, the steering feel feedback model for steer-by-wire is designed, thus achieving good steering wheel steering feel feedback of the vehicle at low, medium and high speeds, lightweight and comfortable steering feel at low speeds, clear and accurate steering feel at high speeds, and distinct steering wheel on-center feel; in the steering feel design method provided in the present invention, the characteristic of reconfigurability is added, corresponding adjustable parameters are set for the calculation of alignment torque based on rack force observation, assist torque, friction compensation torque, damping compensation torque, inertia compensation torque and soft stop limiting torque, and these parameters can be freely designed, thus adapting to different steering wheel hardware characteristics and steering feel requirements, fully leveraging the flexibility advantage of the steer-by-wire system, considering the different driving styles of drivers, and achieving personalized steering wheel feel customization to meet diverse driving needs.

(2) The adjustable parameters set in the present invention fully consider the steering feel feedback characteristics at various vehicle speeds to meet the requirements of lightweight steering feel at low speeds and clear and accurate steering feel at high speeds, thus achieving lightweight steering feel when driving at low speeds, comfortable steering feel during large-angle steering, clear and accurate steering feel when driving at high speeds, and distinct steering wheel on-center feel, and reminding the driver to feel the adhesion state of the tire when the steering wheel is in the large steering angle zone to prevent dangerous large-angle steering behavior.

(3) The present invention defines the objective evaluation indicators related to steering feel and points out the specific influences of each parameter in the steering feel model on the steering feel evaluation indicators, thus facilitating the adjustment of various adjustable parameters.

Figure 1:
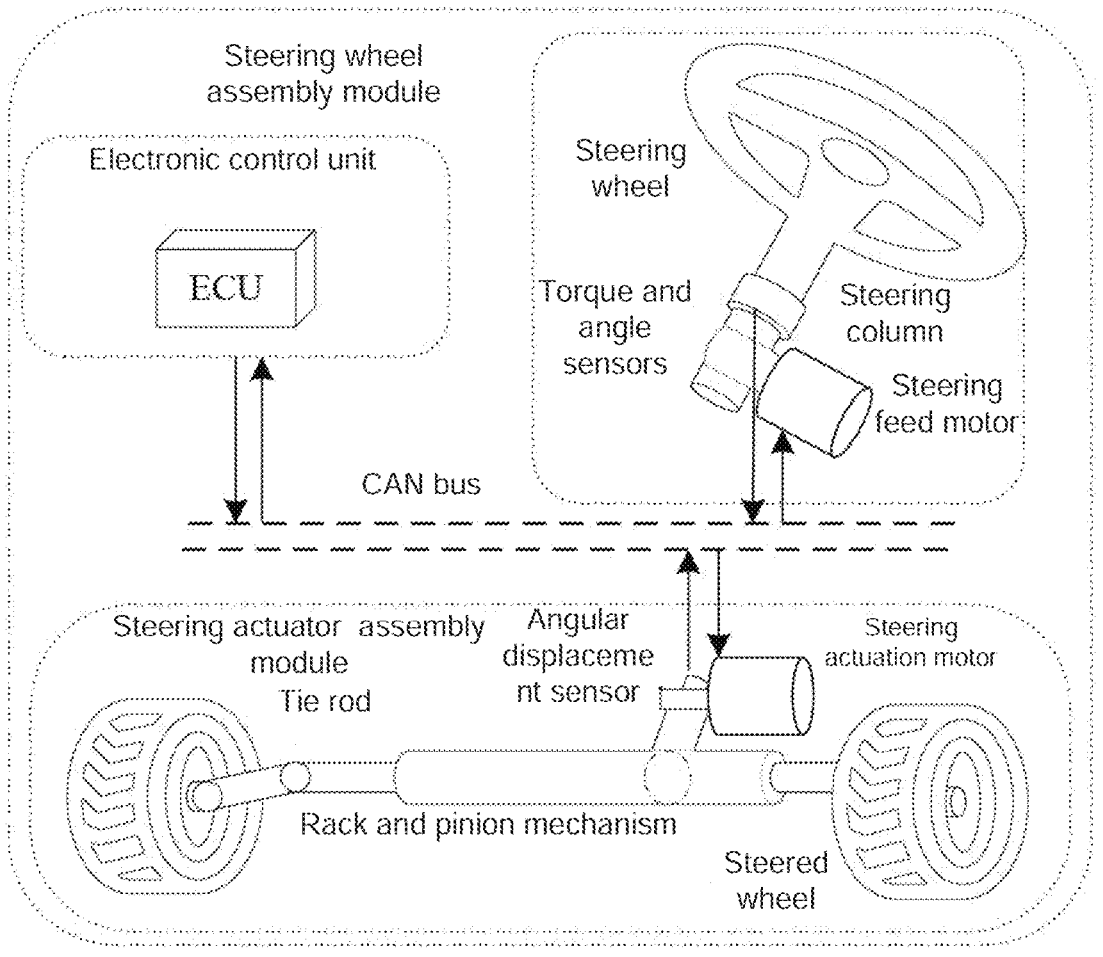
FIG. 1 is a structural diagram of a steer-by-wire system provided in the background of the present invention.

DETAILED DESCRIPTION OF THE
EMBODIMENTS

To make the purposes, technical solutions and advantages of the embodiments of the present invention clearer, the technical solutions in the embodiments of the present invention will be clearly and completely described below with reference to the drawings in the embodiments of the present invention. Apparently, the embodiments described are merely some rather than all of the embodiments of the present invention. Usually, the components described and illustrated in the drawings herein may be disposed and designed in various different configurations.

Therefore, the following detailed description of the embodiments of the present invention provided in the drawings is not intended to limit the scope of protection of the present invention, but only to describe the selected embodiments of the present invention. All other embodiments obtained by those skilled in the art based on the embodiments of the present invention without contributing any inventive labor still fall within the scope of protection of the present invention.

It is to be understood that similar reference signs and letters represent similar items in the following figures. Therefore, once an item is defined in one figure, it does not need to be further defined or explained in the subsequent figures.

Embodiment 1

Referring to FIG. 1, this embodiment provides a reconfigurable steering feel design method for steer-by-wire, which includes the following steps:

constructing a steering feel feedback model, the steering feel feedback model including an alignment torque module based on rack force observation, an assist torque module, a friction compensation torque module, a damping compensation torque module, an inertia compensation torque module, and a soft stop limiting torque module respectively configured to calculate an alignment torque based on rack force observation, an assist torque, a friction compensation torque, a damping compensation torque, an inertia compensation torque, and a soft stop limiting torque, and adding them to obtain a total expected steering feel motor torque;

inputting signals of a steering wheel angle, speed and torque, an observed rack force and a vehicle speed into the steering feel feedback model to obtain the total expected steering feel motor torque, transmitting it to a steering feel motor, and outputting this steering feel feedback torque to a steering wheel through the steering feel motor; and adjusting adjustable parameters of each module in the steering feel feedback model to adapt to different steering wheel hardware characteristics and steering feel requirements.

The various modules of the above steering feel feedback model need to be constructed separately. The idea of constructing each module will be provided below.

the alignment torque module based on rack force observation is configured to segmentally design alignment torques at low speeds and medium-to-high speeds and curve design alignment torques at medium-to-high speeds by adopting a hyperbolic tangent function;

the assist torque module is configured to curve design an assist torque based on an exponential function;

the friction compensation torque module is configured to design a dynamic friction compensation torque and a static friction compensation torque respectively;

the damping compensation torque module is configured to design a damping compensation torque related to steering wheel speed and a damping compensation torque in an aligning process respectively, and adopt an arctangent function and an exponential function to segmentally form the damping compensation torque related to the steering wheel speed;

the inertia compensation torque module is configured to design an inertia compensation torque by adopting a steering wheel torque differentiation method;

the soft stop limiting torque module is configured to design a soft stop limiting torque by adopting an exponential function.

As a preferred embodiment, the method further includes constructing multiple objective evaluation indicators of steering feel, and adjusting the adjustable parameters of each module in the steering feel feedback model based on each objective evaluation indicator of steering feel; and the influencing laws of various adjustment parameters on the objective valuation indicators of steering feel may be determined, so as to facilitate the personalized adjustment of steering feel.

The above schemes will be specifically described below.

1. Steering Feel Feedback Model

Figure 2:
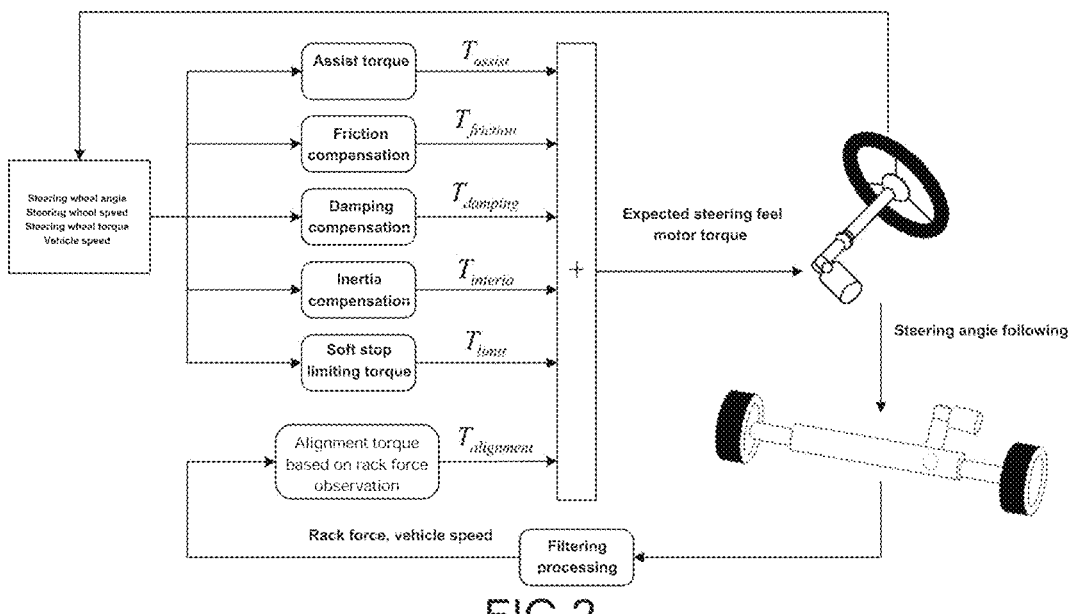
FIG. 2 is a schematic diagram of a data processing and steering feel feedback model in a reconfigurable steering feel design method for steer-by-wire according to an embodiment of the present invention.

The steering feel feedback model consists of two main parts, i.e., a steering feel feedback alignment torque and compensation torques (as shown in FIG. 2). A steer-by-wire controller adds the steering feel feedback alignment torque and the compensation torques to obtain a total expected steering feel motor torque, which is transmitted to a steering feel motor through a CAN signal, the steering feel motor then outputs the steering feel feedback torque to a steering wheel to allow a driver to feel the real steering feel feedback. This model consists of six parts, including an alignment torque module based on rack force observation, an assist torque module, a friction compensation torque module, a damping compensation torque module, an inertia compensation torque module, and a soft stop limiting torque module.

The input parameters of the steering feel feedback model include signals of a steering wheel angle, speed and torque, an observed rack force, and a vehicle speed. The observed rack force is calculated through a rack position sensor signal and a related observer algorithm, and then is filtered. The steering wheel angle, speed and torque are acquired through angle and torque sensors located on the steering wheel. The vehicle speed signal is acquired through a vehicle speed sensor.

It is to be understood that the observed rack force can be obtained not only through a rack force observer, but also through polynomial fitting according to parameters such as steering wheel angle and speed, and vehicle speed, and can also be obtained through a vehicle dynamics model and a tire model.

The overall steering feel design scheme can also use methods such as machine learning and deep learning to obtain a steering feel model through a large amount of steering feel data.

The specific calculation process of each module in the steering feel feedback model is provided below:

1.1 Alignment Torque Module Based on Rack Force Observation

At low speeds (vehicle speed less than $v_0$), the alignment torque may be expressed as:

$$T_{alignment} = K_{a\_low}(v) \cdot G \cdot F_{rack} \cdot R$$

where $T_{alignment}$ is the alignment torque based on rack force observation, $K_{a\_low}(v)$ is a gain adjustment coefficient of the alignment torque with the vehicle speed, G is a gain coefficient of the alignment torque, $F_{rack}$ is the rack force obtained by a rack force observer, R is an equivalent radius of a small gear that converts the rack force into the alignment torque, and $v_0$ is a low-speed threshold, where parameters $K_{a\_low}(v)$ and G are adjustable parameters to achieve a purpose of reconfigurability of steering feel at low speeds;

at high speeds (vehicle speed greater than $v_0$), the alignment torque may be expressed as:

$$T_{alignment} = K_{state} \cdot K_{a\_high}(v) \cdot G \cdot \tanh(K_i(v) \cdot F_{rack} \cdot R)$$

where $K_{a\_high}$ (v) is a gain adjustment coefficient of the alignment torque with the vehicle speed, $K_i(v)$ is an adjustment coefficient of a gradient between the alignment torque and the steering wheel angle with the vehicle speed, $K_{state}$ is an adjustment coefficient of the alignment torque in the steering wheel aligning process, G is a gain coefficient of the alignment torque, $F_{rack}$ is the rack force obtained by the rack force observer, and R is an equivalent radius of a small gear that converts the rack force into the alignment torque, where parameters $K_{a\_low}(v)$, $K_i(v)$, $K_{state}$, G are adjustable parameters or obtained through calibration at different vehicle speeds to achieve a purpose of reconfigurability of steering feel at medium-to-high speeds; the influence of each parameter on the steering feel feedback system is as follows:

$K_{a\_low}(v)$ influences a magnitude of the steering wheel torque at low speeds (less than $v_0$), and increasing this parameter will increase the alignment torque at the corresponding vehicle speed, making the steering feel at low speeds become relatively heavy;

$K_{a\_high}$ (v) influences a magnitude of the steering wheel torque at high speeds (greater than $v_0$), and increasing this parameter will increase the alignment torque at the corresponding vehicle speed, making the steering feel at medium-to-high speeds become relatively heavy;

$K_i(v)$ influences the steering wheel angle when the steering wheel torque reaches saturation at medium-to-high speeds, and increasing this parameter will cause the critical angle to become smaller;

$K_{state}$ influences the magnitude of the alignment torque in the aligning process, and decreasing K return in this parameter will decrease the alignment torque in the aligning process.

1.2 Assist Torque Module

The steering feel of the steer-by-wire system is required to be close to the steering feel of the traditional power assist steering system. Therefore, for some steering wheels with heavy mechanical structures, it is necessary to provide them with a steering assist torque to make the vehicle have a relatively lightweight steering feel at low speeds. A calculation formula for the assist torque is as follows:

$$T_{assist} = G_a \cdot \left(e^{K_a |T_h|} - 1\right) \cdot \text{sgn}(T_h)$$

where $T_{assist}$ is the assist torque, $T_h$ is the steering wheel torque obtained by a steering wheel torque sensor, $G_a$ is an assist gain coefficient, and $K_a$ is an assist curve rise coefficient, where parameters $G_a$ and $K_a$ are adjustable parameters;

the influence of each parameter on the steering feel feedback system is as follows:

$G_a$ influences the magnitude of the assist torque, and increasing this parameter will increase the assist torque;

$K_a$ influences the relationship between the assist torque and the steering wheel torque, and increasing this parameter will increase a gradient of the assist torque with respect to the steering wheel torque, thus increasing the assist torque.

1.3 Friction Compensation Torque Module

If there is excessive friction on the steering wheel, the friction compensation torque needs to be added. The friction compensation torque is divided into a dynamic friction compensation torque and a static friction compensation torque.

$$T_{friction} = T_{dynamic} + T_{static1} + T_{static2}$$

The calculation formula for the dynamic friction compensation torque is as follows:

$$T_{friction} = T_{dynamic} + T_{static1} + T_{static2}$$

$$T_{dynamic} = \begin{cases} f_{right} \cdot \tanh(a_f \cdot \dot{\theta}_{sw}) & \dot{\theta}_{sw} > 0 \\ f_{left} \cdot \tanh(a_f \cdot \dot{\theta}_{sw}) & \dot{\theta}_{sw} < 0 \end{cases}$$

where $T_{friction}$ is the friction compensation torque, T dynamic is the dynamic friction compensation torque, $\dot{\theta}_{sw}$ is the steering wheel speed, which is obtained by differentiating the steering wheel angle signal detected by a steering wheel angle sensor, $f_{right}$, $f_{left}$ are respectively the magnitudes of friction compensation torques when rotating the steering wheel to the right and rotating the steering wheel to the left, and $a_f$ is the curve rise coefficient, where $f_{right} + f_{left}$, $a_f$ are adjustable parameters;

the calculation formula for the static friction compensation torque is as follows:

$$T_{static1} = \begin{cases} f_{static} \cdot \tanh(b_f \cdot T_h) + c_f \cdot \text{sgn}(T_h) & |T_h| < f_{static}, \dot{\theta}_{sw} = 0 \\ f_{static} \cdot \text{sgn}(T_h) & |T_h| \geq f_{static}, \dot{\theta}_{sw} = 0 \end{cases}$$

$$T_{static2} = \frac{f_{static}}{e^{d_f |\theta_{sw} - \theta_{pre}|}} \cdot \text{sgn}(\theta_{sw} - \theta_{pre})$$

where $T_{static1}$ and $T_{static2}$ are both static friction compensation torques, $\theta_{sw}$ is the steering wheel angle, $T_h$ is the steering wheel torque, $f_{static}$ is the magnitude of compensated static friction, $\theta_{pre}$ is an angle value of the steering wheel at the beginning of rotating at a previous time, and $b_f$, $c_f$, $d_f$ are relevant adjustment coefficients for static friction compensation, where $f_{static}$, $b_f$, $c_f$, $d_f$ are adjustable parameters;

the influence of each parameter on the steering feel feedback system is as follows:

$f_{right}$, $f_{left}$ influence the magnitude of the friction compensation torque when rotating the steering wheel to the right and left respectively, and increasing these parameters will cause the frictional resistance in the corresponding rotating directions to become smaller;

$a_f$ influences the saturation point of the dynamic friction compensation torque with respect to the speed, the dynamic friction compensation torque gradually reaches a saturation value with the increase of the steering wheel speed, and increasing this parameter will cause a corresponding steering wheel speed at which the dynamic friction compensation torque reaches saturation to become smaller.

$f_{static}$ influences the magnitude of the static friction compensation torque, and increasing this parameter will cause a static friction force felt by a driver to become smaller;

$b_f$, $c_f$, $d_f$ influence the feel of the driver to static friction, where $b_f$, $c_f$ influence the static friction feel before rotating the steering wheel, increasing these parameters will cause a static friction compensation before rotating the steering wheel to become larger, $d_f$ influences the feel when the steering wheel starts and stops frequently, increasing this parameter will cause the static friction compensation at the beginning of rotating the steering wheel to become smaller, and it is necessary to adjust parameters $b_f$, $c_f$, $d_f$ to make the driver have a more comfortable feel to static friction.

1.4 Damping Compensation Torque Module

When the vehicle is at medium-to-high speeds, adverse road conditions such as bumps and undulations may be amplified to the steering wheel. In this case, the driver is particularly sensitive to the fluctuations of the steering wheel, which will lead to a decrease in the driving comfort. In addition, at high speeds, the steering rack force of the vehicle is large, resulting in a very large alignment torque, which may cause the aligning process of the steering wheel to be very quick, even produce back and forth oscillations of the steering wheel, and cause the vehicle to lose control under serious situations. Therefore, the functions of the damping compensation torque module in the present invention are divided into damping compensation at medium-to-high speeds and damping compensation in the aligning process.

$$T_{damping} = T_{damping1} + T_{damping2}$$

The calculation formula for the damping compensation torque at medium-to-high speeds is as follows:

$$T_{damping1} = B(v) \cdot \tanh(a_{d3} \cdot \dot{\theta}_{sw})$$

$$B(v) = \begin{cases} 0 & v \le v_{d1} \\ a_{d1} \cdot \text{atan}[a_{d2}(v - v_{d1})] & v_{d1} < v < v_{d2} \\ a_{d4} \cdot \exp[a_{d5}(v - v_{d1})] & v \ge v_{d2} \end{cases}$$

where $T_{damping}$ is the damping compensation torque, $T_{damping1}$ is the damping compensation torque at medium-to-high speeds, $T_{damping2}$ the damping compensation in the aligning process, the speeds are medium-to-high speeds when the vehicle speed v is greater than $v_0$, and $v_0$ is a low speed threshold; $\dot{\theta}_{sw}$ is the steering wheel speed, B(v) is an adjustment coefficient of the damping compensation torque with the vehicle speed, $v_{d1}$ is a critical vehicle speed at the beginning of applying the damping compensation, $v_{d2}$ is a boundary vehicle speed of medium-to-high speeds, after which the damping compensation increases rapidly with the increase of the vehicle speed, and $a_{d1}$, $a_{d2}$, $a_{d3}$, $a_{d4}$, ads are relevant adjustment parameters of the damping compensation torque, wherein $v_{d1}$, $v_{d2}$, $a_{d1}$, $a_{d2}$, $a_{d3}$, $a_{d4}$, $a_{d5}$ are all adjustable parameters;

the damping compensation in the aligning process mainly solves the problem of excessive steering wheel speed in the aligning process, and the calculation formula for it is as follows:

$$T_{damping2} = -a_{d6}[e^{a_{d7}(|\dot{\theta}_{sw}|-\dot{\theta}_0)} - 1] \cdot \frac{|\theta_{sw}| - \theta_0}{180} \cdot \text{sgn}(\dot{\theta}_{sw}),$$

$$|\theta_{sw}| > \theta_0$$

$$|\dot{\theta}_{sw}| > \dot{\theta}_0$$

where $\theta_{sw}$ is the steering wheel angle, $\dot{\theta}_{sw}$ is the steering wheel speed, $\theta_0$ is a critical angle at the beginning of applying the damping compensation in the aligning process, $\dot{\theta}_0$ is a critical speed at the beginning of applying the damping compensation in the aligning process, and $a_{d6}$, $a_{d7}$ are relevant adjustment parameters for the damping compensation torque in the aligning process, where $\theta_0$, $\dot{\theta}_0$, $a_{d6}$, $a_{d7}$ are all adjustable parameters;

the influence of each parameter on the steering feel feedback system is as follows:

$v_{d1}$ is a defined boundary speed between low speed and medium speed, the damping compensation will be applied only when the vehicle speed is greater than this value, increasing this parameter will increase the critical vehicle speed value at the beginning of applying the damping compensation;

$v_{d2}$ is a defined boundary speed between medium speed and high speed, after which the damping compensation increases rapidly with the increase of the vehicle speed;

$a_{d1}$, $a_{d4}$ influence the magnitude of the damping compensation at medium speeds and high speeds respectively, and increasing these parameters will increase the damping compensation torque;

$a_{d2}$, $a_{d5}$ influence the relationship of the damping compensation varying with the vehicle speed at medium speeds and high speeds respectively, and the increasing these parameters will cause an increase gradient of the damping compensation torque with the vehicle speed to become larger within a corresponding speed range;

$a_{d3}$ influences the relationship between the damping compensation and the steering wheel speed, and increasing this parameter will cause an increase gradient of the damping compensation torque with the steering wheel speed to become larger;

$\theta_0$, $\dot{\theta}_0$ are the critical steering wheel angle and the critical steering wheel speed at the beginning of applying the damping compensation in the aligning process, and these parameters need to be reasonably selected, so as to prevent the steering wheel aligning speed from being too fast in the aligning process, without influencing a driver to normally rotate the steering wheel;

$a_{d6}$, $a_{d7}$ influence the magnitude of the damping compensation torque in the aligning process, and increasing these parameters will cause a damping in the aligning process to become larger, so as to further limit the steering wheel speed.

1.5 Inertia Compensation Torque Module

When the driver makes a rapid turn with large angular acceleration, due to the inertia of the steering wheel module, an inertia torque will be generated, resulting in a jerking feel. The expression for the inertia torque of the steering wheel module is as follows:

$$T_I = -J \cdot \ddot{\theta}_{sw}$$

where j is a moment of inertia of the steering wheel module, and $\ddot{\theta}_{sw}$ is the angular acceleration of the steering wheel.

Since the second-order differentiation of the steering wheel angle is involved in the inertia torque, if a compensation torque $-T_i$ opposite to the inertia torque is directly given to the steering wheel, a large amount of noise will be introduced, causing the steering wheel torque to fluctuate. Therefore, a steering wheel torque differentiation method is adopted for steering wheel inertia compensation, and the calculation formula for the inertia compensation torque is as follows:

$$T_{inertia} = G_{inertia} \dot{T}_h$$

where $T_{inertia}$ is the inertia compensation torque, $T_h$ is a differential of the steering wheel where $T_{inertia}$ torque, $G_{inertia}$ is a gain coefficient of the inertia compensation torque, where $G_{inertia}$ IS an adjustable parameter;

the influence of each parameter on the steering feel feedback system is as follows:

$G_{inertia}$ influences the magnitude of the inertia compensation torque, and increasing this parameter will increase the inertia compensation torque.

1.6 Soft Stop Limiting Torque Module

The function of the soft stop limiting module is to limit the maximum rotatable angle of the steering wheel. In the traditional steering system, there is a relevant mechanical connection to limit the maximum rotation angle of the steering wheel, but the steer-by-wire system eliminates this mechanical connection. Therefore, a limiting module for the steering wheel needs to be redesigned in the steer-by-wire system.

A calculation formula for the soft stop limiting torque is as follows:

$$T_{limit} = \begin{cases} k_{limit}[e^{a_{limit}(|\theta_{sw}|-\theta_{limit})} - 1] \cdot \mathrm{sgn}(\theta_{sw}) & |\theta_{sw}| > \theta_{limit} \\ 0 & |\theta_{sw}| \le \theta_{limit} \end{cases}$$

where $T_{limit}$ is the soft stop limiting torque, $\theta_{sw}$ is the steering wheel angle detected by the steering wheel angle sensor, $\theta_{limit}$ is a limiting angle, $k_{limit}$ is a limiting torque gain coefficient, and a limit is a limiting torque rise coefficient, where $\theta_{limit}$, $k_{limit}$ are adjustable parameters;

the influence of each parameter on the steering feel feedback system is as follows:

$\theta_{limit}$ influences a limiting range, exceeding this limiting angle will apply a limiting torque opposite to the rotation direction, and increasing this parameter will increase the maximum rotatable angle of the steering wheel;

$k_{limit}$ influences the magnitude of the limiting torque, and increasing this parameter will cause the limiting torque to increase proportionally more rapidly after the steering wheel angle exceeds the limiting angle, and its effect is greater than parameter $k_{limit}$;

$a_{limit}$ influences the increase gradient of the limiting torque, and increasing this parameter will cause the limiting torque to increase more rapidly after the steering wheel angle exceeds the limiting value.

II. Steering Feel Adjustment Parameters

TABLE 1

| Steering feel adjustment parameters and their functions | | | |
|---|---|---|---|
| Associated module | S/N | Parameter | Function |
| Alignment | 1 | $K_{a\_low}$ (v) | To adjust the overall steering feel level at low speeds |
| torque module | 2 | $K_{a\_high}$ (v) | To adjust the overall steering feel level at medium-to-high speeds |
| based on rack force | 3 | $K_i$ (v) | To adjust the saturation range of the steering wheel torque at medium-to-high speeds |
| Assist torque | 4 | $G_a$ | To adjust the magnitude of the assist torque |
| module | 5 | $K_a$ | To adjust the shape of the assist curve |
| Friction compensation module | 6 | $f_{right}$ | To adjust the magnitude of the dynamic friction compensation when rotating the steering wheel to the right |
| | 7 | $f_{left}$ | To adjust the magnitude of the dynamic friction compensation when rotating the steering wheel to the left |
| | 8 | $a_f$ | To adjust the application smoothness of the dynamic friction compensation |
| | 9 | $f_{static}$ | To adjust the magnitude of the static friction compensation |
| Damping | 10 | B (v) | To adjust the magnitude of the damping compensation |
| compensation | 11 | $v_{d1}$ | To adjust the minimum vehicle speed for enabling the damping compensation |
| module | 12 | $a_{d3}$ | To adjust the curve of the relationship of the damping compensation with respect to the steering wheel speed |
| | 13 | $a_{d6}$ | To adjust the damping applied to prevent the aligning speed from being too fast |
| Inertia compensation module | 14 | $G_{inertia}$ | To adjust the inertial feel |
| Soft stop | 15 | $\theta_{limit}$ | To adjust the limiting angle |
| limiting module | 16 | $k_{limit}$ | To adjust the magnitude of the limiting torque |
| | 17 | $a_{limit}$ | To adjust the increase gradient of the limiting torque |

The relevant steering feel adjustment parameters and their functions in the present invention are as shown in Table 1. These parameters may be freely designed to adapt to different steering wheel hardware characteristics and steering feel requirements. The free design of these parameters constitutes the characteristic of reconfigurability of steering feel in the present invention.

III. Objective Evaluation Indicators of Steering Feel

To highlight the characteristic of reconfigurability of steering feel in the present invention and facilitate the description of the influence of each steering feel adjustment parameter on steering feel, it is necessary to firstly define the relevant objective evaluation indicators of steering feel. Referring to ISO13674 standard, the following objective evaluation indicators of steering feel are defined, where indicators (1) to (8) are evaluation indicators for high-speed on-center steering conditions, mainly reflecting the changes in the steering wheel torque relative to the steering wheel angle or lateral acceleration of the vehicle under high speed and small lateral acceleration conditions; indicators (9) and (10) are evaluation indicators for steering feel lightweight at medium-to-low speeds, as summarized in Table 2.

(1) Steering Angle Hysteresis

Figure 3:
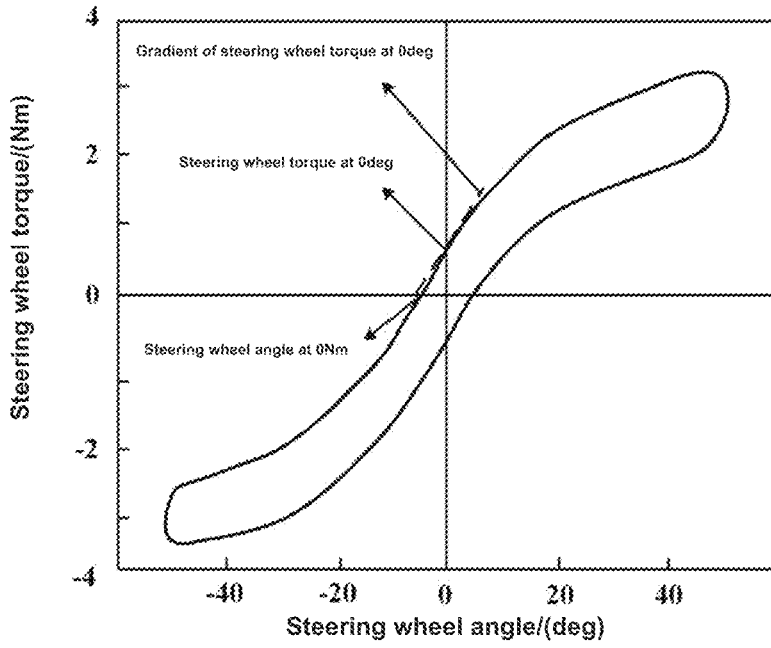
FIG. 3 is a chart of a relationship curve between steering wheel torque and steering wheel angle according to an embodiment of the present invention.

Referring to FIG. 3, steering angle hysteresis is defined as a residual steering wheel angle when the steering wheel torque is zero, and describes a hysteresis of the steering wheel angle with respect to the steering wheel torque. This indicator has a significant influence on the feel of the driver during the steering wheel aligning stage. The smaller the value, the lighter the alignment of the steering wheel.

(2) Steering Friction

Referring to FIG. 3, steering friction is defined as a value of a residual steering wheel torque when the steering wheel angle is zero, and describes a friction level of a steering system. The larger the indicator, the larger the torque required for rotating the steering wheel.

(3) Steering Torque Stiffness

Referring to FIG. 3, steering torque stiffness is defined as a gradient of the steering wheel torque when the steering wheel angle is zero, and describes a feel of a driver to a center position of the steering wheel when driving at high speeds. The larger the indicator, the more obvious the feel of the driver to the center position of the steering wheel.

(4) Steering Alignment Capability

Figure 4:
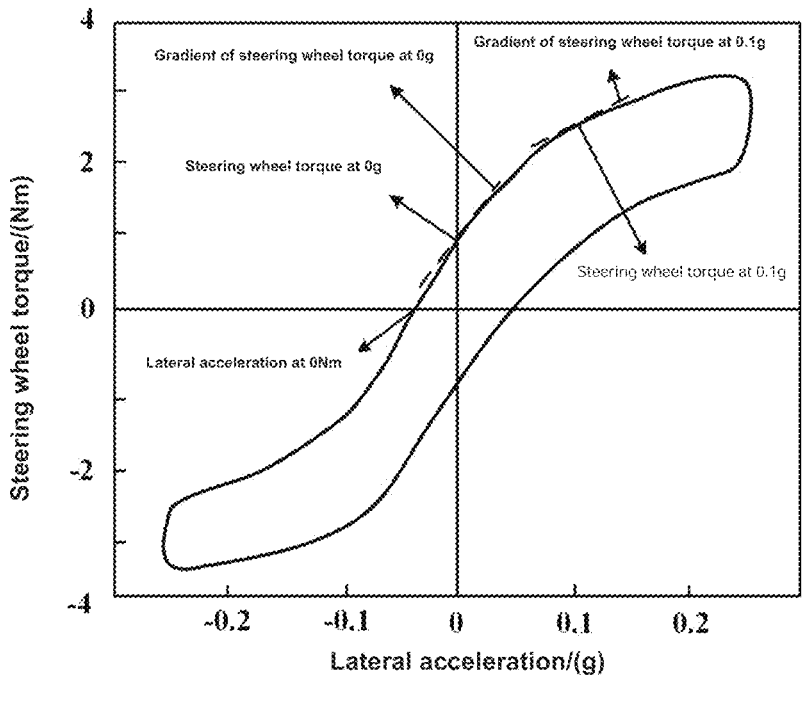
FIG. 4 is a chart of a relationship curve between steering wheel torque and lateral acceleration according to an embodiment of the present invention.

Referring to FIG. 4, steering alignment capability is defined as a residual lateral acceleration of a vehicle when the steering wheel torque is zero. This indicator directly reflects an aligning performance of the steering system of the vehicle. The smaller the indicator, the better the aligning performance of the vehicle in the center area.

(5) Steering On-Center Force

Referring to FIG. 4, steering on-center force is defined as a magnitude of the steering wheel torque when a lateral acceleration of the vehicle is zero, and describes a dry friction of the steering system.

(6) Steering On-Center Feel

Referring to FIG. 4, steering on-center feel is defined as a gradient of the steering wheel torque when the lateral acceleration of the vehicle is zero. This indicator directly reflects handling characteristics of the vehicle. The larger the indicator, the clearer the steering feel in the center area. However, excessively large steering on-center feel may cause a significant driving burden to the driver.

(7) Steering Nonlinear Force

Referring to FIG. 4, steering nonlinear force is defined as a magnitude of the steering wheel torque when the lateral acceleration of the vehicle is 0.1 g, and describes a magnitude of the nonlinear force of the steering wheel. The larger the indicator, the larger the overall steering torque level.

(8) Steering Nonlinearity

Referring to FIG. 4, steering linearity is defined as a ratio of the gradient of the steering wheel torque to the steering on-center feel when the lateral acceleration of the vehicle is 0.1 g, and describes a change extent of the steering feel when the steering wheel deviates from the center area. The larger the indicator, the clearer the steering feel in the non-center area.

(9) Maximum Steering Wheel Torque

Maximum steering wheel torque is defined as the maximum value of the steering wheel torque at medium-to-low speeds, and describes a steering feel of the driver during large-angle steering at medium-to-low speeds.

(10) Average Steering Wheel Torque

Average steering wheel torque is defined as an average value of the steering wheel torque during sine steering at medium-to-low speeds, describes a level of the steering wheel torque at medium-to-low speeds, and reflects the average steering feel and driving burden of the driver.

TABLE 2

| | | | Objective evaluation indicators of steering feel | |
| --- | --- | --- | --- | --- |
| Curve | S/N | Evaluation indicator | Definition | Unit |
| Steering wheel torque-angle relationship curve | 1 | Steering angle hysteresis | Steering wheel angle when the steering wheel torque is 0 Nm | ° |
| | 2 | Steering friction | Magnitude of the steering wheel torque when the steering wheel angle is 0° | Nm |
| | 3 | Steering torque stiffness | Steering wheel torque gradient when the steering wheel angle is 0° | Nm/° |
| Steering wheel torque-lateral acceleration relationship curve | 4 | Steering alignment capability | Lateral acceleration when the steering wheel torque is 0 Nm | g |
| | 5 | Steering on-center force | Magnitude of the steering wheel torque when the lateral acceleration is 0 g | Nm |
| | 6 | Steering on-center feel | Gradient of the steering wheel torque when the lateral acceleration is 0 g | Nm/g |
| | 7 | Steering nonlinear force | Magnitude of steering wheel torque when the lateral acceleration is 0.1 g | Nm |
| | 8 | Steering linearity | Ratio of the gradient of the steering wheel torque to the steering | / |

TABLE 2-continued

| Objective evaluation indicators of steering feel | | | | |
|---|---|---|---|---|
| Curve | S/N | Evaluation indicator | Definition | Unit |
| Steering wheel torque curve | 9 | Maximum steering wheel torque | on-center feel when a lateral acceleration of is 0.1 g Maximum value of the steering wheel torque at medium-to-low speeds | Nm |
| | 10 | Average steering wheel torque | Average value of the steering wheel torque during sine steering at medium-to-low speeds | Nm |

IV. Influences of Adjustment Parameters on Evaluation Indicators

To highlight the characteristic of reconfigurability of the steering feel in the present invention and facilitate the personalized adjustment of the steering feel, the present invention will elaborate the influence of each steering feel adjustment parameter in the steering feel model on the objective evaluation indicators defined in Table 2.

For indicator 1, i.e., steering angle hysteresis, the parameters that have a positive correlation with it include $B(v)$, $a_{d3}$ and $a_{d6}$ of the damping compensation module, where $B(v)$ is the main influencing parameter; the parameters that have a negative correlation with it include $K_a(v)$ and $K_i(v)$ of the alignment torque module, and f of the friction compensation module, where $K_i(v)$ is the main influencing parameter.

For indicator 2, i.e., steering friction, the parameter that has a positive correlation with it includes $B(v)$ of the damping compensation module; the parameters that have a negative correlation with it include $K_a(v)$ and $K_i(v)$ of the alignment torque module, $G_a$ of the assist module, and f of the friction compensation module, where $K_i(v)$ and f are the main influencing parameters.

For indicator 3, i.e., steering torque stiffness, the parameters that have a positive correlation with it include $K_a(v)$ and $K_i(v)$ of the alignment torque module, where $K_i(v)$ is the main influencing parameter; the parameter that has a negative correlation with it includes $G_a$ of the assist module.

For indicator 4, i.e., steering alignment capability, the parameters that have a positive correlation with it include $B(v)$, $a_{d3}$ and $a_{d6}$ of the damping compensation module, where $B(v)$ is the main influencing parameter; the parameters that have a negative correlation with it include $K_a(v)$ and $K_i(v)$ of the alignment torque module, and f of the friction compensation module, where $K_i(v)$ is the main influencing parameter.

For indicator 5, i.e., steering on-center force, the parameters that have a positive correlation with it include $B(v)$ and $a_{d3}$ of the damping compensation module, where $B(v)$ is the main influencing parameter; the parameters that have a negative correlation with it include $K_a(v)$ and $K_i(v)$ of the alignment torque module, $G_a$ of the assist module, and f of the friction compensation module, where $K_i(v)$ and f are the main influencing parameters.

For indicator 6, i.e., steering nonlinear force, the parameters that have a positive correlation with it include $K_a(v)$ and $K_i(v)$ of the alignment torque module, and $B(v)$ of the damping compensation module, where $K_i(v)$ is the main influencing parameter; the parameters that have a negative correlation with it includes $G_a$ of the assist module and f of the friction compensation module, where $G_a$ is the main influencing parameter.

For indicator 7, i.e., steering on-center feel, the parameters that have a positive correlation with it include $K_a(v)$ and $K_i(v)$ of the alignment torque module; the parameter that has a negative correlation with it includes $G_a$ of the assist module.

For indicator 8, i.e., steering linearity, the parameters that have a positive correlation with it include $K_a(v)$ and $K_i(v)$ of the alignment torque module, and $B(v)$ of the damping compensation module; the parameter that has a negative correlation with it includes $G_a$ of the assist module.

For indicator 9, i.e., average steering wheel torque, the parameters that have a positive correlation with it include $K_a(v)$ and $K_i(v)$ of the alignment torque module, and $B(v)$ of the damping compensation module, where $K_i(v)$ is the main influencing parameter; the parameters that have a negative correlation with it include $G_a$ of the assist module and f of the friction compensation module, where $G_a$ is the main influencing parameter.

For indicator 10, i.e., maximum steering wheel torque, the parameters that have a positive correlation with it include $K_a(v)$ of the alignment torque module and $B(v)$ of the damping compensation module, where $K_a(v)$ is the main influencing parameter; the parameters that have a negative correlation with it include $G_a$ of the assist module, f of the friction compensation module, and $G_{inertia}$ of the inertia compensation module, where $G_a$ is the main influencing parameter.

This embodiment further provides a reconfigurable steering feel control system for steer-by-wire, which includes a memory and a processor. The memory stores a computer program which, when invoked by the processor, implements the steps of the reconfigurable steering feel design method for steer-by-wire described above.

This embodiment further provides an automobile, which includes a memory and a processor. The memory stores a computer program which, when invoked by the processor, implements the steps of the reconfigurable steering feel design method for steer-by-wire described above.

What are described above are specific exemplary embodiments of the present invention. It is to be understood that those skilled in the art may make various modifications and changes according to the concept of the present invention without contributing any inventive labor. Therefore, all technical solutions that can be obtained by those skilled in the art according to the concept of the present invention through logical analysis, reasoning, or limited experiments based on the existing technologies still fall within the scope of protection defined by the claims.

The invention claimed is:

1. A reconfigurable steering feel design method for steer-by-wire, comprising the following steps:

constructing a steering feel feedback model, the steering feel feedback model comprising an alignment torque module based on rack force observation, an assist torque module, a friction compensation torque module, a damping compensation torque module, an inertia compensation torque module, and a soft stop limiting torque module respectively configured to calculate an alignment torque based on rack force observation, an assist torque, a friction compensation torque, a damping compensation torque, an inertia compensation torque, and a soft stop limiting torque;

inputting signals of a steering wheel angle, speed and torque, an observed rack force and a vehicle speed into the steering feel feedback model, and adding the alignment torque based on rack force observation, the assist torque, the friction compensation torque, the damping compensation torque, the inertia compensation torque, and the soft stop limiting torque to obtain the total expected steering feel motor torque, transmitting it to a steering feel motor, and outputting the steering feel feedback torque to a steering wheel through the steering feel motor; and adjusting adjustable parameters of each module in the steering feel feedback model to adapt to different steering wheel hardware characteristics and steering feel requirements;

wherein the alignment torque module based on rack force observation is configured to segmentally design alignment torques at low speeds and medium-to-high speeds, and curve design alignment torques at medium-to-high speeds by adopting a hyperbolic tangent function; the speeds are low speeds when the vehicle speed is less than a low-speed threshold, and the speeds are medium-to-high speeds when the vehicle speed is greater than the low-speed threshold;

the assist torque module is configured to curve design an assist torque based on an exponential function;

the friction compensation torque module is configured to design a dynamic friction compensation torque and a static friction compensation torque respectively;

the damping compensation torque module is configured to design a damping compensation torque related to steering wheel speed and a damping compensation torque in an aligning process of the steering wheel respectively, and adopt an arctangent function and an exponential function to segmentally form the damping compensation torque related to the steering wheel speed;

the inertia compensation torque module is configured to design an inertia compensation torque by adopting a steering wheel torque differentiation method;

the soft stop limiting torque module is configured to design a soft stop limiting torque by adopting an exponential function.

2. The reconfigurable steering feel design method for steer-by-wire according to claim 1, wherein a calculation expression for the alignment torque module based on rack force observation is:

when the vehicle speed v is less than $v_0$, $$T_{alignment} = K_{a\_low}(v) \cdot G \cdot F_{rack} \cdot R$$

where $T_{alignment}$ is the alignment torque based on rack force observation, $K_{a\_low}(v)$ is a gain adjustment coefficient of the alignment torque with the vehicle speed, G is a gain coefficient of the alignment torque, $F_{rock}$ is the rack force obtained by a rack force observer, R is an equivalent radius of a small gear that converts the rack force into the alignment torque, and $v_0$ is the low-speed threshold, wherein parameters $K_{a\_low}(v)$ and G are adjustable parameters to achieve a purpose of reconfigurability of steering feel at low speeds;

when the vehicle speed v is greater than $v_0$, $$T_{alignment} = K_{state} \cdot K_{a\_high}(v) \cdot G \cdot \tanh(K_i(v) \cdot F_{rack} \cdot R)$$

where $K_{a\_high}(v)$ is a gain adjustment coefficient of the alignment torque with the vehicle speed, $K_i(v)$ is an adjustment coefficient of a gradient between the alignment torque and the steering wheel angle with the vehicle speed, $K_{state}$ is an adjustment coefficient of the alignment torque in the aligning process, G is a gain coefficient of the alignment torque, $F_{rock}$ is the rack force obtained by the rack force observer, and R is an equivalent radius of a small gear that converts the rack force into the alignment torque, wherein parameters $K_{a\_high}(v)$, $K_i(v)$, $K_{state}$, G are adjustable parameters to achieve a purpose of reconfigurability of steering feel at medium-to-high speeds;

the adjustment laws of the adjustable parameters of the alignment torque module based on rack force observation comprise:

increasing parameter $K_{a\_low}(v)$ will increase the alignment torque at the corresponding vehicle speed, making the steering feel at low speeds become heavy;

increasing parameter $K_{a\_high}(v)$ will increase the alignment torque at the corresponding vehicle speed, making the steering feel at medium-to-high speeds become heavy;

increasing parameter $K_i(v)$ will cause a critical angle of the steering wheel angle to become smaller when a steering wheel torque at medium-to-high speeds reaches saturation;

decreasing parameter $K_{state}$ will decrease the alignment torque in the aligning process.

3. The reconfigurable steering feel design method for steer-by-wire according to claim 1, characterized in that a calculation expression for the assist torque module is:

$$T_{assist} = G_a \cdot (e^{K_a|T_h|} - 1) \cdot \text{sgn}(T_h)$$

where $T_{assist}$ is the assist torque, $T_h$ is a steering wheel torque obtained by a steering wheel torque sensor, $G_a$ is an assist gain coefficient, and $K_a$ is an assist curve rise coefficient, wherein parameters $G_a$ and $K_a$ are adjustable parameters;

the adjustment laws of the adjustable parameters of the assist torque module comprise:

increasing parameter $G_a$ will increase the assist torque;

increasing parameter $K_a$ will increase a gradient of the assist torque with respect to the steering wheel torque, thus increasing the assist torque.

4. The reconfigurable steering feel design method for steer-by-wire according to claim 1, wherein a calculation expression for the friction compensation torque module is:

-continued $$T_{friction} = T_{dynamic} + T_{static1} + T_{static2}$$

$$T_{dynamic} = \begin{cases} f_{right} \cdot \tanh(a_f \cdot \theta_{sw}) & \dot{\theta}_{sw} > 0 \\ f_{left} \cdot \tanh(a_f \cdot \theta_{sw}) & \dot{\theta}_{sw} < 0 \end{cases}$$

$$B(v) = \begin{cases} 0 & v \leq v_{d1} \\ a_{d1} \cdot \text{atan}[a_{d2}(v - v_{d1})] & v_{d1} < v < v_{d2} \\ a_{d4} \cdot \exp[a_{d5}(v - v_{d1})] & v \geq v_{d2} \end{cases}$$

where $T_{friction}$ is the friction compensation torque, $T_{dynamic}$ is the dynamic friction compensation torque, $\dot{\theta}_{sw}$ is the steering wheel speed, which is obtained by differentiating the steering wheel angle signal detected by a steering wheel angle sensor, $f_{right}$, $f_{left}$ are respectively the magnitudes of friction compensation torques when rotating the steering wheel to the right and rotating the steering wheel to the left, and $a_f$ is a curve rise coefficient, wherein $f_{right}$, $f_{left}$, $a_f$ are adjustable parameters;

$$T_{static1} = \begin{cases} f_{static} \cdot \tanh(b_f \cdot T_h) + c_f \cdot \text{sgn}(T_h) & |T_h| < f_{static}, \dot{\theta}_{sw} = 0 \\ f_{static} \cdot \text{sgn}(T_h) & |T_h| \geq f_{static}, \dot{\theta}_{sw} = 0 \end{cases}$$

$$T_{static2} = \frac{f_{static}}{e^{d_f |\theta_{sw} - \theta_{pre}|}} \cdot \text{sgn}(\theta_{sw} - \theta_{pre})$$

where $T_{static1}$ and $T_{static2}$ are both static friction compensation torques, $\theta_{sw}$ is the steering wheel angle, $T_h$ is a steering wheel torque, $f_{static}$ is the magnitude of compensated static friction, $\theta_{pre}$ is an angle value of the steering wheel at the beginning of rotating at a previous time, and $b_f$, $c_f$, $d_f$ are relevant adjustment coefficients for static friction compensation, wherein $f_{static}$, $b_f$, $c_f$, $d_f$ are adjustable parameters;

the adjustment laws of the adjustable parameters of the friction compensation torque module comprise:

increasing parameter $f_{right}$ will cause a frictional resistance to become smaller when rotating the steering wheel to the right;

increasing parameter $f_{left}$ will cause a frictional resistance to become smaller when rotating the steering wheel to the left;

increasing parameter $a_f$ will cause a corresponding steering wheel speed to become smaller when the dynamic friction compensation torque reaches saturation;

increasing parameter $f_{static}$ will cause a static friction force felt by a driver to become smaller;

increasing parameter $b_f$ or $c_f$ will cause a static friction compensation to become larger before rotating the steering wheel;

increasing parameter $d_f$ will cause the static friction compensation to become smaller at the beginning of rotating the steering wheel.

5. The reconfigurable steering feel design method for steer-by-wire according to claim 1, wherein the functions of the damping compensation torque module comprise damping compensation at medium-to-high speeds and damping compensation in the aligning process, and a corresponding calculation expression is:

$$T_{damping} = T_{damping1} + T_{damping2}$$

$$T_{damping1} = B(v) \cdot \tanh(a_{d3} \cdot \dot{\theta}_{sw})$$

where $T_{damping}$ is the damping compensation torque, $T_{damping1}$ is the damping compensation torque at medium-to-high speeds, $T_{damping2}$ the damping compensation in the aligning process, the speeds are medium-to-high speeds when the vehicle speed vis greater than $v_{d1}$, and $v_{d1}$ is the low-speed threshold; $\dot{\theta}_{sw}$ is the steering wheel speed, $B(v)$ is an adjustment coefficient of the damping compensation torque with the vehicle speed, $v_{d1}$ is a critical vehicle speed at the beginning of applying the damping compensation, $v_{d2}$ is a boundary vehicle speed of medium-to-high speeds, after which the damping compensation increases rapidly with the increase of the vehicle speed, and $a_{d1}$, $a_{d2}$, $a_{d3}$, $a_{d4}$, $a_{d5}$ are relevant adjustment parameters of the damping compensation torque, wherein $v_{d1}$, $v_{d2}$, $a_{d1}$, $a_{d2}$, $a_{d3}$, $a_{d4}$, $a_{5d}$ are all adjustable parameters;

$$T_{dampling2} = -a_{d6}\left[e^{a_{d7}\left(|\dot{\theta}_{sw}|-\dot{\theta}_0\right)} - 1\right] \cdot \frac{|\theta_{sw}| - \theta_0}{180} \cdot \text{sgn}(\dot{\theta}_{sw}),$$

$$|\theta_{sw}| > \theta_0$$

$$|\dot{\theta}_{sw}| > \dot{\theta}_0$$

where $\theta_{sw}$ is the steering wheel angle, $\dot{\theta}_{sw}$ is the steering wheel speed, $\theta_0$ is a critical steering wheel angle at the beginning of applying the damping compensation in the aligning process, $\dot{\theta}_0$ is a critical steering wheel speed at the beginning of applying the damping compensation in the aligning process, and $a_{d6}$, $a_{d7}$ are relevant adjustment parameters for the damping compensation torque in the aligning process, wherein $\theta_0$, $\dot{\theta}_0$, $a_{d6}$, $a_{d7}$ are all adjustable parameters;

the adjustment laws of the adjustable parameters of the damping compensation torque module comprise:

increasing parameter $v_{d1}$ will increase the critical vehicle speed value at the beginning of applying the damping compensation;

increasing parameter $v_{d2}$ will increase the critical vehicle speed value when the damping compensation enters a rapidly increasing segment with the vehicle speed;

increasing parameter $a_{d1}$ or $a_{d4}$ will increase the damping compensation torque;

increasing parameter $a_{d2}$ will cause an increase gradient of the damping compensation torque with the vehicle speed to become larger within a medium speed range;

increasing parameter $a_{d5}$ will cause an increase gradient of the damping compensation torque with the vehicle speed to become larger within a high speed range;

increasing parameter $a_{d3}$ will cause an increase gradient of the damping compensation torque with the steering wheel speed to become larger;

increasing parameters $\theta_0$, $\dot{\theta}_0$ will respectively increase the critical steering wheel angle and the critical steering wheel speed at the beginning of applying the damping compensation in the aligning process, so as to prevent the steering wheel aligning speed from being too fast in the aligning process, without influencing a driver to normally rotate the steering wheel;

increasing parameter $a_{d6}$ or $a_{d7}$ will cause a damping in the aligning process to become larger, so as to further limit the steering wheel speed.

6. The reconfigurable steering feel design method for steer-by-wire according to claim 1, wherein an expression for the inertia compensation torque module is:

$$T_{inertia} = G_{inertia} \dot{T}_h$$

where $T_{inertia}$ is the inertia compensation torque, $\dot{T}_h$ is a differential of a steering wheel torque, $G_{inertia}$ is a gain coefficient of the inertia compensation torque, wherein $G_{inertia}$ is an adjustable parameter;
the adjustment law of the adjustable parameter of the inertia compensation torque module comprises:
increasing parameter inertia will increase the inertia compensation torque.

7. The reconfigurable steering feel design method for steer-by-wire according to claim 1, wherein a calculation expression for the soft stop limiting torque module is:

$$T_{limit} = \begin{cases} k_{limit}[e^{a_{limit}(|\theta_{sw}| - \theta_{limit})} - 1] \cdot \text{sgn}(\theta_{sw}) & |\theta_{sw}| > \theta_{limit} \\ 0 & |\theta_{sw}| \le \theta_{limit} \end{cases}$$

where $T_{limit}$ is the soft stop limiting torque, $\theta_{sw}$ is the steering wheel angle detected by a steering wheel angle sensor, $\theta_{limit}$ is a limiting angle, $k_{limit}$ is a limiting torque gain coefficient, and $a_{limit}$ is a limiting torque rise coefficient, wherein $\theta_{limit}$, $k_{limit}$ are adjustable parameters;
the adjustment laws of the adjustable parameters of the soft stop limiting torque module comprise:
increasing parameter $\theta_{limit}$ will increase a maximum rotatable angle of the steering wheel;
increasing parameter $k_{limit}$ will cause the limiting torque to increase proportionally more rapidly after the steering wheel angle exceeds the limiting angle;
increasing parameter $a_{limit}$ will cause the limiting torque to increase more rapidly after the steering wheel angle exceeds the limiting angle, and its effect is greater than parameter $k_{limit}$.

8. The reconfigurable steering feel design method for steer-by-wire according to claim 1, wherein the method further comprises constructing a plurality of objective evaluation indicators of steering feel, and adjusting the adjustable parameters of each module in the steering feel feedback model based on each objective evaluation indicator of steering feel;
the objective evaluation indicators comprise:
a steering angle hysteresis indicator, which is defined as a residual steering wheel angle when a steering wheel torque is zero, and describes a hysteresis of the steering wheel angle with respect to the steering wheel torque;
a steering friction indicator, which is defined as a value of a residual steering wheel torque when the steering wheel angle is zero, and describes a friction level of a steering system;
a steering torque stiffness indicator, which is defined as a gradient of the steering wheel torque when the steering wheel angle is zero, and describes a feel of a driver to a center position of the steering wheel when driving at high speeds;
a steering alignment capability indicator, which is defined as a residual lateral acceleration of a vehicle when the steering wheel torque is zero, and directly reflects an alignment performance of the steering system of the vehicle;
a steering on-center force indicator, which is defined as a magnitude of the steering wheel torque when a lateral acceleration of the vehicle is zero, and describes a dry friction of the steering system;
a steering on-center feel indicator, which is defined as a gradient of the steering wheel torque when the lateral acceleration of the vehicle is zero, and directly reflects handling characteristics of the vehicle;
a steering nonlinear force indicator, which is defined as a magnitude of the steering wheel torque when the lateral acceleration of the vehicle is 0.1 g, and describes a magnitude of the nonlinear force of the steering wheel;
a steering linearity indicator, which is defined as a ratio of the gradient of the steering wheel torque to the steering on-center feel when the lateral acceleration of the vehicle is 0.1 g, and describes a change extent of the steering feel when the steering wheel deviates from a center area;
a maximum steering wheel torque indicator, which is defined as a maximum value of the steering wheel torque at medium-to-low speeds, and describes the steering feel of the driver during large-angle steering at medium-to-low speeds;
an average steering wheel torque indicator, which is defined as an average value of the steering wheel torque during sine steering at medium-to-low speeds, and describes a level of the steering wheel torque at medium-to-low speeds.

* * * * *